US006923903B2

(12) United States Patent
Chester et al.

(10) Patent No.: US 6,923,903 B2
(45) Date of Patent: Aug. 2, 2005

(54) GASOLINE SULFUR REDUCTION IN FLUID CATALYTIC CRACKING

(75) Inventors: Arthur W. Chester, Cherry Hill, NJ (US); Hye Kyung Cho Timken, Woodbury, NJ (US); Terry G. Roberie, Ellicott City, MD (US); Michael S. Ziebarth, Columbia, MD (US)

(73) Assignees: ExxonMobil Oil Corporation, Fairfax, VA (US); W.R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/308,737

(22) Filed: Dec. 3, 2002

(65) Prior Publication Data

US 2003/0089639 A1 May 15, 2003

Related U.S. Application Data

(63) Continuation of application No. 09/221,540, filed on Dec. 28, 1998, now abandoned.

(51) Int. Cl.[7] .............................................. C01G 11/00
(52) U.S. Cl. ............... 208/113; 208/120.2; 208/120.25; 208/120.35; 208/208 R; 208/120.01; 208/244; 208/245; 208/247; 208/248; 208/249
(58) Field of Search ........................... 208/208 R, 248, 208/249, 113, 120.01, 120.2, 120.25, 120.35, 244, 245, 247

(56) References Cited

U.S. PATENT DOCUMENTS

| | | | |
|---|---|---|---|
| 3,293,192 A | 12/1966 | Maher et al. | 252/430 |
| 3,354,078 A | 11/1967 | Miale et al. | 208/120 |
| 3,402,996 A | 9/1968 | Maher et al. | 23/112 |
| 3,442,797 A | 5/1969 | Aldridge | 208/243 |
| 3,494,860 A | 2/1970 | Aldridge | 208/248 |
| 3,607,043 A | 9/1971 | McDaniel et al. | 23/111 |
| 3,676,368 A | 7/1972 | Scherzer et al. | 252/455 Z |
| 3,711,422 A | 1/1973 | Johnson et al. | 252/414 |
| 3,977,963 A | 8/1976 | Readal et al. | 208/420 |
| 4,432,890 A | 2/1984 | Beck et al. | 502/62 |
| 4,480,047 A | 10/1984 | Beck et al. | 502/65 |
| 4,500,651 A | 2/1985 | Lok et al. | 502/208 |
| 4,544,143 A | 10/1985 | Cooper et al. | 266/271 |
| 4,561,968 A | 12/1985 | Beck et al. | 208/120 |
| 4,567,029 A | 1/1986 | Wilson et al. | 423/306 |
| 4,588,702 A * | 5/1986 | Beck et al. | 502/65 |
| 4,615,996 A * | 10/1986 | Occelli | 502/65 |
| 4,683,217 A | 7/1987 | Lok et al. | 502/214 |
| 4,686,092 A | 8/1987 | Lok et al. | 423/306 |
| 4,690,806 A * | 9/1987 | Schorfheide | 423/230 |
| 4,744,970 A | 5/1988 | Lok et al. | 423/306 |
| 4,758,419 A | 7/1988 | Lok et al. | 423/306 |
| 4,790,982 A | 12/1988 | Yoo et al. | 423/239 |
| 4,793,984 A | 12/1988 | Lok et al. | 423/306 |
| 4,794,095 A | 12/1988 | Walker et al. | 502/64 |
| 4,846,960 A | 7/1989 | Walker et al. | 208/119 |
| 4,880,787 A | 11/1989 | Bundens et al. | 502/65 |

(Continued)

FOREIGN PATENT DOCUMENTS

| | | | |
|---|---|---|---|
| CA | 1117511 | 2/1982 | |
| EP | 0 461 851 A2 | 11/1991 | |
| EP | 0 159 624 | 12/1991 | |
| GB | 2 128 977 | 5/1984 | ............. C01F/7/76 |

OTHER PUBLICATIONS

Venuto and Habib, Fluid Catalytic Cracking with Zeolite Catalysts, Marcel Dekker, New York 1979, ISBN 0–8247–6870–1, pp. 32–37.

Richard F. Wormsbecher Alan W. Peters, and James M. Maselli, "Vanadium Poisoning of Cracking Catalysts: Mechanism of Poisoning and Design of Vanadium Tolerant Catalyst System", Journal of Catalyst, vol. 100, pp. 130–137 (1986).

Occelii, M.L., "Metal Resistant Fluid Cracking Catalysts", ACS Symposium Series, Ch 21, pp. 343–362 (1990).

"Shape Selective Catalysis in Industrial Applications", Chen et al. Marcel Dekker Inc., New York 1969, ISBN 0–8247–7856–1, pp. 7–38.

J. Catalysis 67, pp. 218–222 (1981) by Frilette et al.

Stud. Surf. Catal. 37, pp. 13–27 (1987).

Journal of Catalysis, vol. 4, pp. 527–529 (1965); vol. 6, pp. 278–287 (1966); and vol. 61, pp. 390–396 (1980).

Scherzer, "Octane Enhancing Zeolitic FCC Catalysts", Marcel Dekker, New York, 1990, ISBN 0–8247–8399–9, pp. 165–182.

Intercat, Refining Developments, "Additives Improve FCC Process", Hydrocarbon Processing, Nov. 1991, pp. 59–66, by A.S. Krisha, C.R. Hsieh, A.R. English, T.A. Pecararo and C.W. Kuehler, Cheveron Research and Technology Company, Richmond, CA.

"Fluid Catalytic Cracking Handbook", Sadeghbeigi, Gulf Publishing, Houston, Texas, ISBN 0–88415–290–1, Ch. 3, pp. 79 and 88–91.

*Primary Examiner*—Walter D. Griffin
*Assistant Examiner*—James Arnold, Jr.
(74) *Attorney, Agent, or Firm*—Charles A. Cross; Beverly J. Artale

(57) ABSTRACT

The sulfur content of liquid cracking products, especially the cracked gasoline, of the catalytic cracking process is reduced by the use of a sulfur reduction catalyst composition comprising a porous molecular sieve which contains a metal in an oxidation state above zero within the interior of the pore structure of the sieve as well as a cerium component which enhances the stability and sulfur reduction activity of the catalyst. The molecular sieve is normally a faujasite such as USY. The primary sulfur reduction component is normally a metal of Period 3 of the Periodic Table, preferably vanadium. The sulfur reduction catalyst may be used in the form of a separate particle additive or as a component of an integrated cracking/sulfur reduction catalyst.

11 Claims, No Drawings

U.S. PATENT DOCUMENTS

| | | | |
|---|---|---|---|
| 4,935,216 A | 6/1990 | Lok et al. | 423/328 |
| 4,944,864 A * | 7/1990 | Kugler | 208/120 |
| 4,957,718 A | 9/1990 | Yoo et al. | 423/244 |
| 4,957,892 A | 9/1990 | Yoo et al. | 502/63 |
| 4,963,502 A | 10/1990 | Teng et al. | 437/41 |
| 4,963,520 A | 10/1990 | Yoo et al. | 502/64 |
| 4,976,847 A | 12/1990 | Maxwell et al. | 208/120 |
| 5,001,097 A | 3/1991 | Pecoraro | 502/68 |
| 5,098,684 A | 3/1992 | Kresge et al. | 423/277 |
| 5,102,643 A | 4/1992 | Kresge et al. | 423/328 |
| 5,183,559 A | 2/1993 | Kirker et al. | 208/119 |
| 5,198,203 A | 3/1993 | Kresge et al. | 423/718 |
| 5,248,642 A | 9/1993 | Kumar et al. | 502/65 |
| 5,260,240 A | 11/1993 | Guthrie et al. | 502/41 |
| 5,376,608 A | 12/1994 | Wormsbecher et al. | 502/61 |
| 5,401,391 A | 3/1995 | Collins et al. | 208/208 R |
| 5,482,617 A | 1/1996 | Collins et al. | 208/227 |
| 5,525,210 A | 6/1996 | Wormsbecher et al. | 208/122 |
| 5,599,441 A | 2/1997 | Collins et al. | 208/208 R |
| 5,601,798 A * | 2/1997 | Cooper et al. | 423/700 |
| 5,646,082 A | 7/1997 | Tan-no et al. | 502/65 |
| 5,705,142 A | 1/1998 | Tan-no et al. | 423/700 |
| 5,705,729 A | 1/1998 | Huang | 585/722 |
| 5,919,354 A | 7/1999 | Bartek | 208/299 |
| 5,956,474 A | 9/1999 | Bissett et al. | 395/182.09 |
| 5,965,474 A * | 10/1999 | Balko et al. | 502/65 |

* cited by examiner

GASOLINE SULFUR REDUCTION IN FLUID CATALYTIC CRACKING

CROSS REFERENCE TO RELATED APPLICATIONS

This application is related to application Ser. No. 09/144,607, filed 31 Aug. 1998.

This is a continuation of application Ser. No. 09/221,540, filed Dec. 28, 1998 now abandoned.

Application Ser. No. 09/221,539, filed concurrently describes catalyst compositions for the reduction of sulfur in gasolines based on large pore zeolites, especially zeolite USY which contain vanadium and rare earth cations.

FIELD OF THE INVENTION

This invention relates to the reduction of sulfur in gasolines and other petroleum products produced by the catalytic cracking process. The invention provides a catalytic composition for reducing product sulfur and a process for reducing the product sulfur using this composition.

BACKGROUND OF THE INVENTION

Catalytic cracking is a petroleum refining process which is applied commercially on a very large scale, especially in the United States where the majority of the refinery gasoline blending pool is produced by catalytic cracking, with almost all of this coming from the fluid catalytic cracking (FCC) process. In the catalytic cracking process heavy hydrocarbon fractions are converted into lighter products by reactions taking place at elevated temperature in the presence of a catalyst, with the majority of the conversion or cracking occurring in the vapor phase. The feedstock is so converted into gasoline, distillate and other liquid cracking products as well as lighter gaseous cracking products of four or less carbon atoms per molecule. The gas partly consists of olefins and partly of saturated hydrocarbons.

During the cracking reactions some heavy material, known as coke, is deposited onto the catalyst. This reduces its catalytic activity and regeneration is desired. After removal of occluded hydrocarbons from the spent cracking catalyst, regeneration is accomplished by burning off the coke and then the catalyst activity is restored. The three characteristic steps of the catalytic cracking can be therefore be distinguished: a cracking step in which the hydrocarbons are converted into lighter products, a stripping step to remove hydrocarbons adsorbed on the catalyst and a regeneration step to burn off coke from the catalyst. The regenerated catalyst is then reused in the cracking step.

Catalytic cracking feedstocks normally contain sulfur in the form of organic sulfur compounds such as mercaptans, sulfides and thiophenes. The products of the cracking process correspondingly tend to contain sulfur impurities even though about half of the sulfur is converted to hydrogen sulfide during the cracking process, mainly by catalytic decomposition of non-thiophenic sulfur compounds. The distribution of sulfur in the cracking products is dependent on a number of factors including feed, catalyst type, additives present, conversion and other operating conditions but, in any event a certain proportion of the sulfur tends to enter the light or heavy gasoline fractions and passes over into the product pool. With increasing environmental regulation being applied to petroleum products, for example in the Reformulated Gasoline (RFG) regulations, the sulfur content of the products has generally been decreased in response to concerns about the emissions of sulfur oxides and other sulfur compounds into the air following combustion processes.

One approach has been to remove the sulfur from the FCC feed by hydrotreating before cracking is initiated. While highly effective, this approach tends to be expensive in terms of the capital cost of the equipment as well as operationally since hydrogen consumption is high. Another approach has been to remove the sulfur from the cracked products by hydrotreating. Again, while effective, this solution has the drawback that valuable product octane may be lost when the high octane olefins are saturated.

From the economic point of view, it would be desirable to achieve sulfur removal in the cracking process itself since this would effectively desulfurize the major component of the gasoline blending pool without additional treatment. Various catalytic materials have been developed for the removal of sulfur during the FCC process cycle but, so far, most developments have centered on the removal of sulfur from the regenerator stack gases. An early approach developed by Chevron used alumina compounds as additives to the inventory of cracking catalyst to adsorb sulfur oxides in the FCC regenerator; the adsorbed sulfur compounds which entered the process in the feed were released as hydrogen sulfide during the cracking portion of the cycle and passed to the product recovery section of the unit where they were removed. See Krishna et al, *Additives Improve FCC Process*, Hydrocarbon Processing, November 1991, pages 59–66. The sulfur is removed from the stack gases from the regenerator but product sulfur levels are not greatly affected, if at all.

An alternative technology for the removal of sulfur oxides from regenerator removal is based on the use of magnesium-aluminum spinels as additives to the circulating catalyst inventory in the FCCU. Under the designation DESOX™ used for the additives in this process, the technology has achieved a notable commercial success. Exemplary patents on this type of sulfur removal additive include U.S. Pat. Nos. 4,963,520; 4,957,892; 4,957,718; 4,790,982 and others. Again, however, product sulfur levels are not greatly reduced.

A catalyst additive for the reduction of sulfur levels in the liquid cracking products is proposed by Wormsbecher and Kim in U.S. Pat. Nos. 5,376,608 and 5,525,210, using a cracking catalyst additive of an alumina-supported Lewis acid for the production of reduced-sulfur gasoline but this system has not achieved significant commercial success. The need for an effective additive for reducing the sulfur content of liquid catalytic cracking products has therefore persisted.

In application Ser. No. 09/144,607, filed 31 Aug. 1998, we have described catalytic materials for use in the catalytic cracking process which are capable of reducing the sulfur content of the liquid products of the cracking process. These sulfur reduction catalysts comprise, in addition to a porous molecular sieve component, a metal in an oxidation state above zero within the interior of the pore structure of the sieve. The molecular sieve is in most cases a zeolite and it may be a zeolite having characteristics consistent with the large pore zeolites such as zeolite beta or zeolite USY or with the intermediate pore size zeolites such as ZSM-5. Non-zeolitic molecular sieves such as MeAPO-5, MeAPSO-5, as well as the mesoporous crystalline materials such as MCM-41 may be used as the sieve component of the catalyst. Metals such as vanadium, zinc, iron, cobalt, and gallium were found to be effective for the reduction of sulfur in the gasoline, with vanadium being the preferred metal. When used as a separate particle additive catalyst, these materials are used in combination with the active catalytic cracking catalyst (normally a faujasite such as zeolite Y, especially as zeolite USY) to process hydrocarbon feedstocks in the fluid catalytic cracking (FCC) unit to produce low-sulfur. Since the sieve component of the sulfur reduction catalyst may itself be an active cracking catalyst, for instance, zeolite USY, it is also possible to use the sulfur reduction catalyst in the form of an integrated cracking/sulfur reduction catalyst system, for example, comprising USY as the active cracking component and the sieve component of the sulfur reduction system together with added matrix material such as silica, clay and the metal, e.g. vanadium, which provides the sulfur reduction functionality.

Another consideration in the manufacture of FCC catalysts has been catalyst stability, especially hydrothermal stability since cracking catalysts are exposed during use to repeated cycles of reduction (in the cracking step) followed by stripping with steam and then by oxidative regeneration which produces large amounts of steam from the combustion of the coke, a carbon-rich hydrocarbon, which is deposited on the catalyst particles during the cracking portion of the cycle. Early in the development of zeolitic cracking catalysts it was found that a low sodium content was required not only for optimum cracking activity but also for stability and that the rare earths such as cerium and lanthanum conferred greater hydrothermal stability. See, for example, *Fluid Catalytic Cracking with Zeolite Catalysts*, Venuto et al., Marcel Dekker, New York, 1979, ISBN 0-8247-6870-1.

SUMMARY OF THE INVENTION

We have now developed catalytic materials for use in the catalytic cracking process which are capable of improving the reduction in the sulfur content of the liquid products of the cracking process including, in particular, the gasoline and middle distillate cracking fractions. The present sulfur reduction catalyst are similar to the ones described in application Ser. No. 09/144,607 in that a metal component in an oxidation state above zero is present in the pore structure of a molecular sieve component of the catalyst composition, with preference again being given to vanadium. In the present case, however, the composition also comprises cerium. We have found that the presence of the cerium component not only enhances the stability of the catalyst, as compared to the catalysts which contain only vanadium or another metal component (other than rare earth) but that it also increases the sulfur reduction activity. This is surprising since cerium in itself has no sulfur reduction activity.

The present sulfur reduction catalysts may be used in the form of an additive catalyst in combination with the active cracking catalyst in the cracking unit, that is, in combination with the conventional major component of the circulating cracking catalyst inventory which is usually a matrixed, zeolite containing catalyst based on a faujasite zeolite, usually zeolite Y. Alternatively, they may be used in the form of an integrated cracking/product sulfur reduction catalyst system.

According to the present invention, the sulfur removal catalyst composition comprises a porous molecular sieve which contains (i) a metal in an oxidation state above zero within the interior of the pore structure of the sieve and (ii) a cerium component. The molecular sieve is in most cases a zeolite and it may be a zeolite having characteristics consistent with the large pore zeolites such as zeolite beta or zeolite USY or with the intermediate pore size zeolites such as ZSM-5. Non-zeolitic molecular sieves such as MeAPO-5, MeAPSO-5, as well as the mesoporous crystalline materials such as MCM41 may be used as the sieve component of the catalyst. Metals such as vanadium, zinc, iron, cobalt, and gallium are effective. If the selected sieve material has sufficient cracking activity, it may be used as the active catalytic cracking catalyst component (normally a faujasite such as zeolite Y) or, alternatively, it may be used in addition to the active cracking component, whether or not it has any cracking activity of itself. The present compositions are useful to process hydrocarbon feedstocks in fluid catalytic cracking (FCC) units to produce low-sulfur gasoline and other liquid products, for example, light cycle oil that can be used as a low sulfur diesel blend component or as heating oil.

While the mechanism by which the metal-containing zeolite catalyst compositions remove the sulfur components normally present in cracked hydrocarbon products is not precisely understood, it does involve the conversion of organic sulfur compounds in the feed to inorganic sulfur so that the process is a true catalytic process. In this process, it is believed that a zeolite or other molecular sieve provides shape selectivity with varying pore size, and the metal sites in zeolite provide adsorption sites for the sulfur species.

DETAILED DESCRIPTION

FCC Process

The present sulfur removal catalysts are used as a catalytic component of the circulating inventory of catalyst in the catalytic cracking process, which these days is almost invariably the fluid catalytic cracking (FCC) process. For convenience, the invention will be described with reference to the FCC process although the present additives could be used in the older moving bed type (TCC) cracking process with appropriate adjustments in particle size to suit the requirements of the process. Apart from the addition of the present additive to the catalyst inventory and some possible changes in the product recovery section, discussed below, the manner of operating the process will remain unchanged. Thus, conventional FCC catalysts may be used, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1.

Somewhat briefly, the fluid catalytic cracking process in which the heavy hydrocarbon feed containing the organosulfur compounds will be cracked to lighter products takes place by contact of the feed in a cyclic catalyst recirculation cracking process with a circulating fluidizable catalytic cracking catalyst inventory consisting of particles having a size ranging from about 20 to about 100 microns. The significant steps in the cyclic process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form liquid cracking products including gasoline, (iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

In the present process, the sulfur content of the gasoline portion of the liquid cracking products, is effectively brought to lower and more acceptable levels by carrying out the catalytic cracking in the presence of the sulfur reduction catalyst.

FCC Cracking Catalyst

The present sulfur reduction catalyst compositions may be used in the form of a separate particle additive which is added to the main cracking catalyst in the FCCU or, alternatively, they may be used as components of the cracking catalyst to provide an integrated cracking/sulfur reduction catalyst system. The cracking component of the catalyst which is conventionally present to effect the desired cracking reactions and the production of lower boiling cracking products, is normally based on a faujasite zeolite active cracking component, which is conventionally zeolite Y in one of its forms such as calcined rare-earth exchanged type Y zeolite (CREY), the preparation of which is disclosed in U.S. Pat. No. 3,402,996, ultrastable type Y zeolite (USY) as disclosed in U.S. Pat. No. 3,293,192, as well as various partially exchanged type Y zeolites as disclosed in U.S. Pat. Nos. 3,607,043 and 3,676,368. Cracking catalysts such as these are widely available in large quantities from various commercial suppliers. The active cracking component is routinely combined with a matrix material such as silica or alumina as well as a clay in order to provide the desired mechanical characteristics (attrition resistance etc.) as well as activity control for the very active zeolite component or components. The particle size of the cracking catalyst is typically in the range of 10 to 100 microns for effective fluidization. If used as a separate particle additive, the sulfur reduction catalyst (and any other additive) is normally selected to have a particle size and density comparable to that of the cracking catalyst so as to prevent component separation during the cracking cycle.

Sulfur Reduction System—Sieve Component

According to the present invention, the sulfur removal catalyst comprises a porous molecular sieve which contains a metal in an oxidation state above zero within the interior of the pore structure of the sieve. The molecular sieve is in most cases a zeolite and it may be a zeolite having characteristics consistent with the large pore zeolites such as zeolkite Y, preferably zeolite USY, or zeolite beta or with the intermediate pore size zeolites such as ZSM-5, with the former class being preferred.

The molecular sieve component of the present sulfur reduction catalysts may, as noted above, be a zeolite or a non-zeolitic molecular sieve. When used, zeolites may be selected from the large pore size zeolites or intermediate pore zeolites (see *Shape Selective Catalysis in Industrial Applications*, Chen et al, Marcel Dekker Inc., New York 1989, ISBN 0-8247-7856-1, for a discussion of zeolite classifications by pore size according to the basic scheme set out by Frilette et al in *J. Catalysis* 67, 218–222 (1981)). The small pore size zeolites such as zeolite A and erionite, besides having insufficient stability for use in the catalytic cracking process, will generally not be preferred because of their molecular size exclusion properties which will tend to exclude the components of the cracking feed as well as many components of the cracked products. The pore size of the sieve does not, however, appear to be critical since, as shown below, both medium and large pore size zeolites have been found to be effective, as have the mesoporous crystalline materials such as MCM-41.

Zeolites having properties consistent with the existence of a large pore (12 ring) structure which may be used to make the present sulfur reduction catalysts include zeolites Y in its various forms such as Y, REY, CREY, USY, of which the last is preferred, as well as other zeolites such as zeolite L, zeolite beta, mordenite including de-aluminated mordenite, and zeolite ZSM-18. Generally, the large pore size zeolites are characterized by a pore structure with a ring opening of at least 0.7 nm and the medium or intermediate pore size zeolites will have a pore opening smaller than 0.7 nm but larger than about 0.56 nm. Suitable medium pore size zeolites which may be used include the pentasil zeolites such as ZSM-5, ZSM-22, ZSM-23, ZSM-35, ZSM-50, ZSM-57, MCM-22, MCM-49, MCM-56 all of which are known materials. Zeolites may be used with framework metal elements other than aluminum, for example, boron, gallium, iron, chromium.

The use of zeolite USY is particularly desirable since this zeolite is typically used as the active cracking component of the cracking catalyst and it is therefore possible to use the sulfur reduction catalyst in the form of an integrated cracking/sulfur reduction catalyst system. The USY zeolite used for the cracking component may also, to advantage, be used as the sieve component for a separate particle additive catalyst as it will continue to contribute to the cracking activity of the overall catalyst present in the unit. Stability is correlated with low unit cell size with USY and, for optimum results, the UCS for the USY zeolite in the finished catalyst should be from 2.420 to 2.455 nm, preferably 2.420 to 2.445 nm, with the range of 2.435 to 2.440 nm being very suitable. After exposure to the repeated steaming of the FCC cycles, further reductions in UCS will take place to a final value which is normally within the range of 2.420 to 2.430 nm In addition to the zeolites, other molecular sieves may be used although they may not be as favorable since it appears that some acidic activity (conventionally measured by the alpha value) is required for optimum performance. Experimental data indicate that alpha values in excess of about 10 (sieve without metal content) are suitable for adequate desulfurization activity, with alpha values in the range of 0.2 to 2,000 being normally suitable[1]. Alpha values from 0.2 to 300 represent the normal range of acidic activity for these materials when used as additives.

The alpha test is a convenient method of measuring the overall acidity, inclusive of both its internal and external acidity, of a solid material such as a molecular sieve. The test is described in U.S. Pat. No. 3,354,078; in the Journal of Catalysis, Vol. 4, p. 527 (1965); Vol. 6, p. 278 (1966); and Vol. 61, p. 395 (1980). Alpha values reported in this specification are measured at a constant temperature of 538° C.

Exemplary non-zeolitic sieve materials which may provide suitable support components for the metal component of the present sulfur reduction catalysts include silicates (such as the metallosilicates and titanosilicates) of varying silica-alumina ratios, metalloaluminates (such as germaniumaluminates), metallophosphates, aluminophosphates such as the silico- and metalloaluminophosphates referred to as metal integrated aluminophosphates (MeAPO and ELAPO), metal integrated silicoaluminophosphates (MeAPSO and ELAPSO), silicoaluminophosphates (SAPO), gallogermanates and combinations of these. A discussion on the structural relationships of SAPO's, AIPO's, MeAPO's, and MeAPSO's may be found in a number of resources including *Stud. Surf. Catal.* 37 13–27 (1987). The AIPO's contain aluminum and phosphorus, whilst in the SAPO's some of the phosphorus and/or some of both phosphorus and aluminum is replaced by silicon. In the MeAPO's various metals are present, such as Li, B, Be, Mg, Ti, Mn, Fe, Co, An, Ga, Ge, and As, in addition to aluminum and phosphorus, whilst the MeAPSO's additionally contain silicon. The negative charge of the $Me_aAl_bP_cSi_dO_e$ lattice is compensated by cations, where Me is magnesium, manganese, cobalt, iron and/or zinc. $Me_xAPSOs$ are described in U.S. Pat. No. 4,793,984. SAPO-type sieve materials are described in U.S. Pat. No. 4,440,871; MeAPO type catalysts are described in U.S. Pat. Nos. 4,544,143 and 4,567,029; ELAPO catalysts are described in U.S. Pat. No. 4,500,651, and ELAPSO catalysts are described in European Patent Application 159,624. Specific molecular sieves are described, for example, in the following patents: MgAPSO or MAPSO-U.S. Pat. No. 4,758,419. MnAPSO-U.S. Pat. No. 4,686,092; CoAPSO-U.S. Pat. No. 4,744,970; FeAPSO-U.S. Pat. No. 4,683,217 and ZnAPSO U.S. Pat. No. 4,935,216. Specific silicoaluminophosphates which may be used include SAPO-11, SAPO-17, SAPO-34, SAPO-37; other specific sieve materials include MeAPO-5, MeAPSO-5.

Another class of crystalline support materials which may be used is the group of mesoporous crystalline materials exemplified by the MCM-41 and MCM-48 materials. These mesoporous crystalline materials are described in U.S. Pat. Nos. 5,098,684; 5,102,643; and 5,198,203. MCM-41, which is described in U.S. Pat. No. 5,098,684, is characterized by a microstructure with a uniform, hexagonal arrangement of pores with diameters of at least about 1.3 nm: after calcination it exhibits an X-ray diffraction pattern with at least one d-spacing greater than about 1.8 nm and a hexagonal electron diffraction pattern that can be indexed with a d100 value greater than about 1.8 nm which corresponds to the d-spacing of the peak in the X-ray diffraction pattern. The preferred catalytic form of this material is the aluminosilicate although other metallosilicates may also be utilized. MCM-48 has a cubic structure and may be made by a similar preparative procedure.

Metal Components

Two metal components are incorporated into the molecular sieve support material to make up the present catalytic compositions. One component is cerium which is thought to be present in the form of cations within the pore structure of the sieve. The other metal component can be regarded as the primary sulfur reduction component although the manner in which it effects sulfur reduction is not clear, as discussed in application Ser. No. 09/144,607, to which reference is made for a description of sulfur reduction catalyst compositions containing vanadium and other metal components effective for this purpose. For convenience this component of the composition will be referred to in this application as the primary sulfur reduction component. In order to be effective, this metal (or metals) should be present inside the pore structure of the sieve component. Metal-containing zeolites and other molecular sieves can be prepared by (1) post-addition of metals to the sieve or to a catalyst containing the sieve(s), (2) synthesis of the sieve(s) containing metal atoms in the framework structure, and by (3) synthesis of the sieve(s) with trapped, bulky metal ions in the zeolite pores. Following addition of the metal component, washing to remove unbound ionic species and drying and calcination should be performed. These techniques are all known in themselves. Post-addition of the metal ions is preferred for simplicity and economy, permitting available sieve materials to be converted to use for the present additives. A wide variety of post-addition methods of metals can be used to produce a catalyst of our invention, for example, aqueous exchange of metal ions, solid-state exchange using metal halide salt(s), impregnation with a metal salt solution, and vapor deposition of metals. In each case, however, it is important to carry out the metal(s) addition so that the metal component enters the pore structure of the sieve component.

It has been found that when the metal of the primary sulfur reduction component is present as exchanged cationic species in the pores of the sieve component, the hydrogen transfer activity of the metal component is reduced to the point that hydrogen transfer reactions taking place during the cracking process will normally maintained at an acceptably low level with the preferred metal components. Thus, coke and light gas make during cracking increase slightly but they remain within tolerable limits. Since the unsaturated light ends can be used in any event as alkylation feed and in this way recycled to the gasoline pool, there is no significant loss of gasoline range hydrocarbons incurred by the use of the present additives.

Because of the concern for excessive coke and hydrogen make during the cracking process, the metals for incorporation into the additives should not exhibit hydrogenation activity to a marked degree. For this reason, the noble metals such as platinum and palladium which possess strong hydrogenation-dehydrogenation functionality are not desirable. Base metals and combinations of base metals with strong hydrogenation functionality such as nickel, molybdenum, nickel-tungsten, cobalt-molybdenum and nickel-molybdenum are not desirable for the same reason. The preferred base metals are the metals of Period 3, Groups 5, 8, 9, 12, (IUPAC classification, previously Groups 2B, 5B and 8B) of the Periodic Table. Vanadium, zinc, iron, cobalt, and gallium are effective with vanadium being the preferred metal component. It is surprising that vanadium can be used in this way in an FCC catalyst composition since vanadium is normally thought to have a very serious effect on zeolite cracking catalysts and much effort has been expended in developing vanadium suppressers. See, for example, Wormsbecher et al, *Vanadium Poisoning of Cracking Catalysts: Mechanism of Poisoning and Design of Vanadium Tolerant Catalyst System*, J. Catalysis 100, 130–137 (1986). It is believed that the location of the vanadium inside the pore structure of the sieve immobilizes the vanadium and prevents it from becoming vanadic acid species which can combine deleteriously with the sieve component; in any event, the present zeolite-based sulfur reduction catalysts containing vanadium as the metal component have undergone repeated cycling between reductive and oxidative/steaming conditions representative of the FCC cycle while retaining the characteristic zeolite structure, indicating a different environment for the metal.

Vanadium is particularly suitable for gasoline sulfur reduction when supported on zeolite USY. The yield structure of the V/USY sulfur reduction catalyst is particularly interesting. While other zeolites, after metals addition, demonstrate gasoline sulfur reduction, they tend to convert gasoline to $C_3$ and $C_4$ gas. Even though much of the converted $C_3=$ and $C_4=$ can be alkylated and re-blended back to the gasoline pool, the high $C_4-$ wet gas yield may be a concern since many refineries are limited by their wet gas compressor capacity. The metal-containing USY has similar yield structure to current FCC catalysts; this advantage would allow the V/USY zeolite content in a catalyst blend to be adjusted to a target desulfurization level without limitation from FCC unit constraints. The vanadium on Y zeolite catalyst, with the zeolite represented by USY, is therefore a particularly favorable combination for gasoline sulfur reduction in FCC. The USY which has been found to give particularly good results is a USY with low unit cell size in the range from 2.420 to 2.450 nm, preferably 2.435 to 2.450 nm (following treatment) and a correspondingly low alpha value. Combinations of base metals such as vanadium/zinc as the primary sulfur reduction component may also be favorable in terms of overall sulfur reduction.

The amount of the primary sulfur reduction metal component in the sulfur reduction catalyst is normally from 0.1 to 10 weight percent, typically 0.25 to 5 weight percent, (as metal, relative to weight of sieve component) but amounts outside this range, for example, up to 10 weight percent may still be found to give some sulfur removal effect. When the sieve is matrixed, the amount of the primary sulfur reduction metal component expressed relative to the total weight of the catalyst composition will, for practical purposes of formulation, typically extend from 0.05 to 5, more typically from 0.1 to 3 weight percent of the entire catalyst.

The second metal component of the sulfur reduction catalyst composition comprises cerium which is present within the pore structure of the molecular sieve and is thought to be present in the form of cations exchanged onto the exchangeable sites present on the sieve component. The cerium component significantly not only improves the catalyst stability in the presence of vanadium (or other primary sulfur reduction metal component) but also enhances the sulfur reduction activity of the catalyst. For example, higher cracking activity can be achieved with a Ce/V/USY catalyst compared to a V/USY catalyst, while comparable gasoline sulfur reduction is obtained. In application Ser. No. 09/_____, filed concurrently with this application (Mobil IP Case 10101-1, PL 98-75), we show that other rare earths are effective for improving catalyst stability when vanadium is present and that combinations of rare earth with cerium are capable of improving sulfur reduction.

The amount of cerium is typically from 0.1 to 10 wt. percent of the catalyst composition, in most cases from 0.25 to 5 wt. percent. Relative to the weight of the sieve, the amount of the rare earth will normally be from about 0.2 to 20 weight percent and in most cases from 0.5 to 10 weight percent of the sieve, depending on the sieve:matrix ratio.

The rare earth component can suitably be incorporated into the molecular sieve component by exchange onto the sieve, either in the form of the unmatrixed crystal or of the matrixed catalyst. When the composition is being formulated with the preferred USY zeolite sieve, a very effective manner of incorporation is to add the rare earth ions to the USY sieve (typically 2.445–2.465 nm unit cell size) followed by additional steam calcination to lower the unit cell size of the USY to a value typically in the range of 2.420 to 2.450, preferably 2.430 to 2.445 nm., after which the primary metal component may be added if not already present. The USY should have a low alkali metal (mainly sodium) content for stability as well as for satisfactory cracking activity; this will normally be secured by the ammonium exchange made during the ultrastabilization process to a desirable low sodium level of not more than 1 weight percent, preferably not more than 0.5 weight percent, on the sieve.

The metal components are incorporated into the catalyst composition in a way which ensures that they enter the interior pore structure of the sieve. The metals may be incorporated directly into the crystal or into the matrixed catalyst. When using the preferred USY zeolite as the sieve component, this can suitably be done as described above, by recalcining a USY cracking catalyst containing the cerium component to ensure low unit cell size and then incorporating the metal, e.g. vanadium, by ion exchange or by impregnation under conditions which permit cation exchange to take place so that the metal ion is immobilized in the pore structure of the zeolite. Alternatively, the primary sulfur reduction component and the cerium component can be incorporated into the sieve component, e.g. USY zeolite or ZSM-5 crystal, after any necessary calcination to remove organics from the synthesis after which the metal-containing component can be formulated into the finished catalyst composition by the addition of the cracking and matrix components and the formulation spray dried to form the final catalyst.

When the catalyst is being formulated as an integrated catalyst system, it is preferred to use the active cracking component of the catalyst as the sieve component of the sulfur reduction system, preferably zeolite USY, both for simplicity of manufacture but also for retention of controlled cracking properties. It is, however, possible to incorporate another active cracking sieve material such as zeolite ZSM-5 into an integrated catalyst system and such systems may be useful when the properties of the second active sieve material are desired, for instance, the properties of ZSM-5. The impregnation/exchange process should in both cases be carried out with a controlled amount of metal so that the requisite number of sites are left on the sieve to catalyze the cracking reactions which may be desired from the active cracking component or any secondary cracking components which are present, e.g. ZSM-5.

Use of Sulfur Reduction Catalyst Composition

Normally the most convenient manner to use the sulfur reduction catalyst will be as a separate particle additive to the catalyst inventory. In its preferred form, with zeolite USY as the sieve component, the addition of the catalyst additive to the total catalyst inventory of the unit will not result in significant reduction in overall cracking because of the cracking activity of the USY zeolite. The same is true when another active cracking material is used as the sieve component. When used in this way, the composition may be used in the form of the pure sieve crystal, pelleted (without matrix but with added metal components) to the correct size for FCC use. Normally, however, the metal-containing sieve will be matrixed in order to achieve adequate particle attrition resistance and to maintain satisfactory fluidization. Conventional cracking catalyst matrix materials such as alumina or silica-alumina, usually with added clay, will be suitable for this purpose. The amount of matrix relative to the sieve will normally be from 20:80 to 80:20 by weight. Conventional matrixing techniques may be used.

Use as a separate particle catalyst additive permits the ratio of sulfur reduction and cracking catalyst components to be optimized according to the amount of sulfur in the feed and the desired degree of desulfurization; when used in this manner, it is typically used in an amount from 1 to 50 weight percent of the entire catalyst inventory in the FCCU; in most cases the amount will be from 5 to 25 weight percent, e.g. 5 to 15 weight percent. About 10 percent represents a norm for most practical purposes. The additive may be added in the conventional manner, with make-up catalyst to the regenerator or by any other convenient method. The additive remains active for sulfur removal for extended periods of time although very high sulfur feeds may result in loss of sulfur removal activity in shorter times.

The alternative to the use of the separate particle additive is to use the sulfur reduction catalyst incorporated into the cracking catalyst to form an integrated FCC cracking/gasoline sulfur reduction catalyst. If the sulfur reduction metal components are used in combination with a sieve other than the active cracking component, for example, on ZSM-5 or zeolite beta, when the main active cracking component is USY, the amount of the sulfur reduction components (sieve plus metals) will typically be up to 25 weight percent of the entire catalyst or less, corresponding to the amounts in which it may be used as a separate particle additive, as described above.

Other catalytically active components may be present in the circulating inventory of catalytic material in addition to the cracking catalyst and the sulfur removal additive. Examples of such other materials include the octane enhancing catalysts based on zeolite ZSM-5, CO combustion promoters based on a supported noble metal such as platinum, stack gas desulfurization additives such as DESOX™ (magnesium aluminum spinel), vanadium traps and bottom cracking additives, such as those described in Krishna, Sadeghbeigi, op cit. and Scherzer, *Octane Enhancing Zeolitic FCC Catalysts*, Marcel Dekker, New York, 1990, ISBN 0-8247-8399-9. These other components may be used in their conventional amounts.

The effect of the present additives is to reduce the sulfur content of the liquid cracking products, especially the light and heavy gasoline fractions although reductions are also noted in the light cycle oil, making this more suitable for use as a diesel or home heating oil blend component. The sulfur removed by the use of the catalyst is converted to inorganic form and released as hydrogen sulfide which can be recovered in the normal way in the product recovery section of the FCCU in the same way as the hydrogen sulfide conventionally released in the cracking process. The increased load of hydrogen sulfide may impose additional sour gas/water treatment requirements but with the significant reductions in gasoline sulfur achieved, these are not likely to be considered limitative.

Very significant reductions in gasoline sulfur can be achieved by the use of the present catalysts, in some cases up to about 60% relative to the base case using a conventional cracking catalyst, at constant conversion, using the preferred form of the catalyst described above. Gasoline sulfur reduction of 25% is readily achievable with many of the additives according to the invention, as shown by the Examples below. The extent of sulfur reduction may depend on the original organic sulfur content of the cracking feed, with the greatest reductions achieved with the higher sulfur feeds. The metals content of the equilibrium catalyst in the unit may also affect the degree of desulfurization achieved, with a low metals content, especially vanadium content, on the equilibrium catalyst favoring greater desulfurization. Desulfurization will be very effective with E-catalyst vanadium contents below 1,000 ppm although the present catalyst remain effective even at much higher vanadium contents. Sulfur reduction may be effective not only to improve product quality but also to increase product yield in cases where the refinery cracked gasoline end point has been limited by the sulfur content of the heavy gasoline fraction; by providing an effective and economical way to reduce the sulfur content of the heavy gasoline fraction, the gasoline end point may be extended without the need to resort to expensive hydrotreating, with a consequent favorable effect on refinery economics. Removal of the various thiophene derivatives which are refractory to removal by hydrotreating under less severe conditions is also desirable if subsequent hydrotreatment is contemplated.

EXAMPLE 1

Preparation of Catalyst Series I

A V/USY catalyst, Catalyst A, was prepared using a commercial H-form USY (crystal) with a bulk silica-to-alumina ratio of 5.4 and 2.435 nm unit cell size. A fluid catalyst was prepared by spray drying aqueous slurry containing 40 wt % of the USY crystals, 25 wt % silica, 5 wt % alumina, and 30 wt % kaolin clay. The spray-dried catalyst was calcined at 540° C. (1000° F.) for 3 hours. The resulting H-form USY catalyst was impregnated with a vanadium oxalate solution to target 0.4 wt % V by incipient wetness impregnation. The impregnated V/USY catalyst was further air calcined at 540° C. (1000° F.) for 3 hours. The final catalyst contains 0.39% V.

A Ce+V/USY catalyst, Catalyst B, was prepared from the same, spray-dried H-form USY catalyst intermediate as Catalyst A. The H-form USY catalyst was impregnated with a solution of $Ce(NO_3)_3$ to target 1.5 wt % Ce loading using an incipient wetness impregnation method. Resulting Ce/USY catalyst was air calcined at 540° C. (1000° F.) for 3 hours followed by steaming at 540° C. (1000° F.) for 3 hours. Then the catalyst was impregnated with a vanadium oxalate solution to target 0.4 wt % V by incipient wetness impregnation. The impregnated Ce+V/USY catalyst was further air calcined at 540° C. (1000° F.) for 3 hours. The final catalyst contains 1.4% Ce and 0.43% V.

TABLE 1

Physical Properties of the V and Ce+V USY/Silica-Alumina-Clay Catalysts

|  | V/USY Catalyst A | Ce+V/USY Catalyst B |
|---|---|---|
| Calcined Cat. | | |
| V loading, wt % | 0.39 | 0.43 |
| Ce loading, wt % | N.A. | 1.4 |
| Surface area, $m^2g^{-1}$ | 302 | 250 |
| Alpha | 130 | 12 |
| UCS, nm | 2.436 | 2.437 |

EXAMPLE 2

Preparation of Catalyst Series 2

All samples in Catalyst Series 2 were prepared from a single source of spray dried material, consisting of 50% USY, 21% silica sol and 29% clay. The starting USY had a bulk silica-to-alumina ratio of 5.4 and 2.435 nm unit cell size. The spray dried catalyst was slurried with a solution of $(NH_4)_2SO_4$ and $NH_4OH$ at pH of 6 to remove $Na^+$, followed by washing with water and air calcination at 650° C. (1200° F.) for 2 hours.

A V/USY catalyst, Catalyst C, was prepared using the above H-form USY catalyst. The H-form USY catalyst was impregnated with a vanadium oxalate solution to target 0.5 wt % V by incipient wetness impregnation. The impregnated V/USY catalyst was further air calcined at 650° C. (1200° F.) for 2 hours. The final catalyst contains 0.53% V.

A Ce+V/USY catalyst, Catalyst D, was prepared from the above H-form USY catalyst. The H-form USY catalyst was exchanged with a solution of $CeCl_3$ to target 0.75 wt % Ce loading. Resulting Ce/USY catalyst was air calcined and impregnated with a vanadium oxalate solution to target 0.5 wt % V by incipient wetness impregnation. The impregnated Ce+V/USY catalyst was further air calcined. The final catalyst contains 0.72% Ce and 0.52% V.

A Ce+V/USY catalyst, Catalyst E, was prepared from the above H-form USY catalyst by an exchange with a solution of $CeCl_3$ to target 3 wt % Ce loading. Resulting Ce/USY catalyst was air calcined and impregnated with a vanadium oxalate solution to target 0.5 wt % V by incipient wetness impregnation. The impregnated Ce+V/USY catalyst was further air calcined. The final catalyst contains 1.5% Ce and 0.53% V.

A Ce+V/USY catalyst, Catalyst F, was prepared from the above H-form USY catalyst by an incipient wetness impregnation with a solution of $CeCl_3$ to target 1.5 wt % Ce loading. Resulting Ce/USY catalyst was air calcined and impregnated with a vanadium oxalate solution to target 0.5 wt % V by incipient wetness impregnation. The impregnated Ce+V/USY catalyst was further air calcined. The final catalyst contains 1.5% Ce and 0.53% V.

These catalysts were then steamed deactivated, to simulate catalyst deactivation in an FCC unit, in a fluidized bed steamer at 770° C. (1420° F.) for 20 hours using 50% steam and 50% gas. The gas stream was changed from air, $N_2$, propylene, and to $N_2$ for every ten minutes, then circled back air to simulate the coking/regeneration cycle of a FCC unit (cyclic steaming). Two samples of deactivated catalysts were generated: the steam deactivation cycle was ended with air-burn (ending-oxidation) for one batch of catalysts, and the other ended with propylene (ending-reduction). The coke content of the "ending-reduction" catalyst is less than 0.05% C. The physical properties of the calcined and steam deactivated catalysts are summarized in Table 2.

TABLE 2

Physical Properties of V and Ce+V USY/Silica Sol Catalysts

| | V/USY Catalyst C | Ce+V/USY Catalyst D | Ce+V/USY Catalyst E | Ce+V/USY Catalyst F |
|---|---|---|---|---|
| Calcined Cat. | | | | |
| V loading, wt % | 0.53 | 0.52 | 0.53 | 0.53 |
| Ce loading, wt % | N.A. | 0.72 | 1.5 | 1.5 |
| Na, ppm | 890 | 1190 | 1190 | 1260 |
| Deactivated Cat. (CPS 770° C., 20 hrs) | | | | |
| Surface area, $m^2g^{-1}$ | 237 | 216 | 208 | 204 |
| Unit cell size, nm | 2.425 | 2.423 | 2.425 | 2.425 |

EXAMPLE 3

Preparation of Catalyst Series 3

All samples in Catalyst Series 3 were prepared from a single source of spray dried material, consisting of 40% USY, 30% colloidal silica sol, and 30% clay. The starting H-form USY had a bulk silica-to-alumina ratio of 5.4 and 2.435 nm unit cell size. The spray-dried catalyst was air calcined at 540° C. (1000° F.) for 3 hours.

A Ce/USY catalyst, Catalyst G, was prepared using the above H-form USY catalyst. The H-form USY catalyst was impregnated with a solution of $Ce(NO_3)_3$ to target 1.5 wt % Ce loading using an incipient wetness impregnation method. Resulting Ce/USY catalyst was air calcined at 540° C. (1000° F.) followed by steaming at 540° C. (1000° F.) for 3 hours.

A Ce+V/USY catalyst, Catalyst H, was prepared from Catalyst G. The Ce/USY catalyst was impregnated with a vanadium oxalate solution to target 0.5 wt % V by incipient wetness impregnation. The impregnated Ce+V/USY catalyst was dried and air calcined at 540° C. (1000° F.) for 3 hours. The final catalyst contains 1.4% Ce and 0.49% V.

A Ce+V/USY catalyst, Catalyst I, was prepared from Catalyst G by an exchange with a solution of VOSO4 at pH ~3 to target 0.5 wt % V loading. Resulting Ce+V/USY catalyst was dried and air calcined at 540° C. (1000° F.) for 3 hours. The final catalyst contains 0.9% Ce and 0.47% V. Physical properties of calcined catalysts are summarized in Table 3.

TABLE 3

Physical Properties of the Ce and Ce+V USY/Silica-Clay Catalysts

| | Ce/USY Catalyst G | Ce+V/USY Catalyst H | Ce+V/USY Catalyst I |
|---|---|---|---|
| Calcined Cat. | | | |
| V loading, wt % | N.A. | 0.49 | 0.47 |
| Ce loading, wt % | 1.6 | 1.4 | 0.9 |
| Na, ppm | — | — | 940 |
| Surface area, $m^2g^{-1}$ | 284 | 281 | 272 |
| Alpha | — | 10 | 14 |
| Unit cell size, nm | 2.435 | 2.436 | 2.436 |

EXAMPLE 4

Fluid Catalytic Cracking Evaluation of Series 1 Catalysts

The V and Ce+V USY catalysts from Example 1 were steam deactivated in a fluidized bed steamer at 770° C. (1420° F.) for 20 hours using 50% steam and 50% gas. The gas stream was changed from air, $N_2$, propylene, and to $N_2$ for every ten minutes, then circled back air to simulate coking/regeneration cycle of a FCC unit (cyclic steaming). The steam deactivation cycle was ended with air-burn (ending-oxidation). Twenty-five weight percent of steamed additive catalysts were blended with an equilibrium catalyst from an FCC unit. The equilibrium catalyst has very low metals level (120 ppm V and 60 ppm Ni).

The blended catalysts were tested for gas oil cracking activity and selectivity using an ASTM microactivity test (ASTM procedure D-3907). The vacuum gas oil feed stock properties are shown in Table 4 below. A range of conversions was scanned by varying the catalyst-to-oil ratios and reactions were run at 527° C. (980° F.). Gasoline range product from each material balance was analyzed with a sulfur GC (AED) to determine the gasoline S concentration. To reduce experimental errors in S concentration associated with fluctuations in distillation cut point of gasoline, we quantitated S species ranging from thiophene to $C_4$-thiophenes in syncrude (excluding benzothiophene and higher boiling S species) and the sum was defined as "cut-gasoline S."

TABLE 4

Properties of Vacuum Gas Oil Feed

| Charge Stock Properties | Vacuum Gas Oil |
|---|---|
| API Gravity | 26.6 |
| Aniline Point, ° C. | 83 |
| CCR, wt % | 0.23 |
| Sulfur, wt % | 1.05 |
| Nitrogen, ppm | 600 |
| Basic nitrogen, ppm | 310 |
| Ni, ppm | 0.32 |
| V, ppm | 0.68 |
| Fe, ppm | 9.15 |
| Cu, ppm | 0.05 |
| Na, ppm | 2.93 |
| Distillation, ° C. | |
| IBP, oF | 181 |
| 50 wt %, | 380 |
| 99.5%, | 610 |

Performances of the catalysts are summarized in Table 5, where the product selectivity was interpolated to a constant conversion, 7 wt % conversion of feed to 220° C.–(430° F.–) material.

TABLE 5

Catalytic Cracking Performance of Series 1 Catalysts

|  | ECat Base Case | +25% V/USY cat (Catalyst A) | +25% Ce+V/USY cat (Catalyst B) |
|---|---|---|---|
| MAT Product Yields |  |  |  |
| Conversion, wt % | 70 | 70 | 70 |
| Cat/Oil | 3.3 | 3.8 | 3.7 |
| H2 yield, wt % | 0.03 | +0.04 | +0.13 |
| C1 + C2 Gas, wt % | 1.4 | +0.1 | +0.1 |
| Total C3 Gas, wt % | 5.4 | +0.1 | −0.1 |
| C3 = yield, wt % | 4.5 | +0.1 | −0.1 |
| Total C4 Gas, wt % | 10.9 | +0.2 | −0.2 |
| C4 = yield, wt % | 5.2 | +0.4 | +0.2 |
| iC4 yield, wt % | 4.8 | −0.2 | −0.4 |
| C5 + Gasoline, wt % | 48.9 | −0.3 | −0.3 |
| LFO, wt % | 24.6 | +0.5 | +0.3 |
| HFO, wt % | 4.7 | −0.2 | −0.1 |
| Coke, wt % | 2.7 | +0 | +0.5 |
| Cut Gasoline S, PPM | 529 | 378 | 235 |
| % Reduction in Cut Gasoline S | Base | 29 | 56 |

Table 5 compares the FCC performances of V/USY and Ce+V/USY/Silica-Alumina-Clay catalysts each blended with an equilibrium FCC catalyst (ECat).

Compared to the ECat base case, the addition of V/USY and Ce+V/USY catalyst changes the overall product yield structure only slightly. Yield changes in C4- gas, gasoline, light cycle oil, and heavy fuel oil are all small. Moderate increases in hydrogen and coke yields were observed. While the product yield changes were small, the V/USY and Ce+V/USY catalysts changed the gasoline S concentration substantially. When 25 wt % of Catalyst A (10 wt % V/USY zeolite addition, reference catalyst) was blended with an equilibrium FCC catalyst, 29% reduction in gasoline sulfur concentration was achieved. In comparison, Ce+V/USY catalyst (Catalyst B) gave 56% reduction in gasoline S. Addition of Ce to the V/USY catalyst reduced the gasoline S content by additional 27%, i.e., 93% improvement over the V/USY reference catalyst. Both catalysts have comparable vanadium loadings (0.39% vs. 0.43% V). In light of the fact that Ce by itself does not have any gasoline sulfur reduction activity (see below in Example 7), these results are quite unexpected and clearly demonstrate the benefits of cerium addition.

EXAMPLE 5

Fluid Catalytic Cracking Evaluation of Series 2 Catalysts After Cyclic Steaming

The performances of V and Ce+V catalysts from Example 2 are summarized in this example. The Series 2 catalysts were steam deactivated as described above by cyclic steaming (ending-reduction), then blended with an equilibrium catalyst from an FCC unit in a 25:75 weight ratio. The equilibrium catalyst has very low metals level (120 ppm V and 60 ppm Ni). The results are summarized in Table 6.

TABLE 6

Catalytic Cracking Performance of V vs. Ce+V/USY/Silica-Sol Catalysts

|  | ECat Base Case | +25% V/USY cat (Cat C) | +25% Ce+V/USY (Cat E) | +25% Ce+V/USY (Cat F) |
|---|---|---|---|---|
| MAT Product Yields |  |  |  |  |
| Conversion, wt % | 65 | 65 | 65 | 65 |
| Cat/Oil | 3.0 | 3.4 | 3.2 | 3.3 |
| H2 yield, wt % | 0.03 | +0.02 | +0.02 | +0.02 |
| C1 + C2 Gas, wt % | 1.1 | +0 | +0 | +0.1 |
| Total C3 Gas, wt % | 4.4 | −0.1 | −0.1 | +0 |
| C3 = yield, wt % | 3.7 | +0 | −0.1 | +0 |
| Total C4 Gas, wt % | 9.5 | −0.1 | −0.2 | −0.1 |
| C4 = yield, wt % | 4.8 | +0.1 | +0.1 | +0.1 |
| iC4 yield, wt % | 4.1 | −0.2 | −0.3 | −0.1 |
| C5 + Gasoline, wt % | 47.4 | +0.1 | +0.5 | +0.1 |
| LFO, wt % | 29.7 | −0.2 | +0 | −0.1 |
| HFO, wt % | 5.3 | +0.2 | +0 | +0.1 |
| Coke, wt % | 2.3 | +0.1 | −0.1 | +0 |
| Cut Gasoline S, PPM | 516 | 489 | 426 | 426 |
| % Reduction in Cut Gasoline S | Base | 5.2 | 17.4 | 17.4 |

Table 6 compares FCC performances of V/USY and Ce+V/USY/Silica-Sol additive catalysts after cyclic steam deactivation (ending-reduction).

The deactivated additive catalysts were each blended with an equilibrium FCC catalyst. Compared to the ECat base case, addition of the V/USY and Ce+V/USY catalysts made very little changes in the overall product yield structure. The yields of hydrogen, C4- gas, gasoline, light cycle oil, heavy fuel oil and coke were changed by less than 0.2 wt % each. Additions of the V/USY and Ce+V/USY catalysts changed the gasoline S concentration to different extents. When 25 wt % of Catalyst C (V/USY—reference catalyst) was blended with the equilibrium FCC catalyst, 5.2% reduction in gasoline sulfur concentration was achieved. For comparison, Ce+V/USY catalysts (Catalysts E and F) gave 17.4% reduction in gasoline S, respectively. Addition of Ce to the V/USY catalyst reduced the gasoline S content by additional 12.3%, i.e., 237% improvement over the V/USY reference catalyst.

EXAMPLE 6

Fluid Catalytic Cracking Evaluation of Series 2 Catalysts After Cyclic Steaming

The performances of the V and Ce+V catalysts from Example 2 after cyclic steam deactivation are summarized in this example. The catalysts of Example 2 were deactivated by cyclic steaming as described above (ending-oxidation) and were then blended with an equilibrium catalyst from an FCC unit in 25:75 weight ratio. The equilibrium catalyst has very low metals level (120 ppm V and 60 ppm Ni). The results are summarized in Table 7.

TABLE 7

Catalytic Cracking Performance of V vs. Ce+V/USY/Silica-Sol Catalyst

|  | ECat Base Case | +25% V/USY cat (Cat C) | +25% Ce+V/USY (Cat D) | +25% Ce+V/USY (Cat E) |
|---|---|---|---|---|
| MAT Product Yields |  |  |  |  |
| Conversion, wt % | 70 | 70 | 70 | 70 |
| Cat/Oil | 2.8 | 3.7 | 3.6 | 3.4 |

TABLE 7-continued

Catalytic Cracking Performance of V vs. Ce+V/USY/Silica-Sol Catalyst

|  | ECat Base Case | +25% V/USY cat (Cat C) | +25% Ce+V/USY (Cat D) | +25% Ce+V/USY (Cat E) |
|---|---|---|---|---|
| H2 yield, wt % | 0.03 | +0.12 | +0.13 | +0.12 |
| C1 + C2 Gas, wt % | 1.5 | +0.2 | +0.2 | +0.1 |
| Total C3 Gas, wt % | 5.5 | +0.1 | +0 | −0.1 |
| C3 = yield, wt % | 4.7 | +0 | +0 | −0.1 |
| Total C4 Gas, wt % | 11.1 | +0 | +0 | −0.2 |
| C4 = yield, wt % | 5.8 | +0.1 | +0.1 | +0 |
| iC4 yield, wt % | 4.6 | −0.1 | −0.2 | −0.2 |
| C5 + Gasoline, wt % | 49.4 | −1.0 | −0.9 | −0.5 |
| LFO, wt % | 25.6 | −0.1 | +0 | +0.2 |
| HFO, wt % | 4.4 | +0.1 | +0 | −0.2 |
| Coke, wt % | 2.3 | +0.6 | +0.5 | +0.5 |
| Cut Gasoline S, PPM | 579 | 283 | 243 | 224 |
| % Reduction in Cut Gasoline S | Base | 51.1 | 58.1 | 61.3 |

Table 7 compares the FCC performances of V/USY and Ce+V/USY/Silica-Sol additive catalysts after cyclic steam deactivation (ending-oxidation).

Compared to the ECat base case, addition of V/USY and Ce+V/USY catalyst made slight changes in the overall product yield structure. There were moderate increases in hydrogen and coke yields. Also a small changes in C4- gas yield gasoline, light cycle oil and heavy fuel oil were observed. Addition of the V/USY and Ce+V/USY catalysts changed the gasoline S concentration substantially. When 25 wt % of Catalyst C (V/USY—reference catalyst) was blended with an equilibrium FCC catalyst, 51.1% reduction in gasoline sulfur concentration was achieved. In comparison, the Ce+V/USY catalysts (Catalysts D and E) gave 58.1% and 61.3% reduction in gasoline S, respectively. Addition of Ce to the V/USY catalyst reduced the gasoline S content by additional 7.0–10.2%, i.e., up to 20% improvement over the V/USY reference catalyst.

The product yields data of the V/USY and Ce+V/USY catalysts indicate that the yield changes from the ECat is due to addition of vanadium to the USY catalyst The product yields of V/USY catalyst is comparable to those of Ce+V/USY catalysts except the gasoline S level. These results suggest that Ce increases the gasoline sulfur reduction activity of the V/USY additive catalyst with little effect on product yields.

EXAMPLE 7

Fluid Catalytic Cracking Evaluation of Series 3 Catalysts, Study of Promotional Effects Performances of the Ce and Ce+V catalysts from Example 3 after cyclic steaming deactivation (ending-reduction) as described above, are summarized in this example. The deactivated catalysts were blended with an equilibrium catalyst from an FCC unit in 25:75 weight ratio. The equilibrium catalyst has very low metals level (120 ppm V and 60 ppm Ni). The results are summarized in Table 8.

TABLE 8

Catalytic Cracking Performance of Ce vs. Ce+V/USY/Silica-Clay Catalysts

|  | ECat Base Case | +25% Ce/USY (Cat G) | +25% Ce+V/USY (Cat H) | +25% Ce+V/USY (Cat I) |
|---|---|---|---|---|
| MAT Product Yields |  |  |  |  |
| Conversion, wt % | 70 | 70 | 70 | 70 |
| Cat/Oil | 3.2 | 3.4 | 3.7 | 3.9 |
| H2 yield, wt % | 0.04 | +0 | +0.07 | +0.07 |
| C1 + C2 Gas, wt % | 1.5 | +0.1 | +0.1 | +0.1 |
| Total C3 Gas, wt % | 5.7 | +0.1 | −0.1 | +0 |
| C3 = yield, wt % | 4.8 | +0 | +0 | +0 |
| Total C4 Gas, wt % | 11.5 | +0 | −0.3 | −0.1 |
| C4 = yield, wt % | 5.7 | +0 | +0.1 | +0.1 |
| iC4 yield, wt % | 4.9 | +0 | −0.3 | −0.2 |
| C5 + Gasoline, wt % | 48.8 | −0.2 | −0.2 | −0.7 |
| LFO, wt % | 25.5 | +0 | +0.1 | +0.1 |
| HFO, wt % | 4.5 | +0 | −0.1 | −0.1 |
| Coke, wt % | 2.4 | +0 | +0.3 | +0.6 |
| Cut Gasoline S, PPM | 486 | 487 | 341 | 351 |
| % Reduction in Cut Gasoline S | Base | 0 | 29.8 | 27.7 |

Table 8 compares FCC performances of Ce/USY and Ce+V/USY/Silica-clay additive catalysts after cyclic steam deactivation (ending-reduction).

Compared to the ECat base case, addition of the Ce/USY catalyst made almost no changes in overall product yields. Addition of the Ce+V/USY catalyst made slight changes in the overall product yield structure. There were moderate increases in hydrogen and coke yields, as well as slight changes in C4-gas, gasoline, light cycle oil and heavy fuel oil yields. Addition of the Ce/USY catalysts made a no change in the gasoline S concentration. In contrast, Ce+V/USY catalysts (Catalysts H and I, invention) gave 29.8% and 27.7% reduction in gasoline S, respectively. These results indicate that cerium by itself does not have any gasoline sulfur reduction activity. Cerium appears to have a promotional effect for vanadium to increase the activity of a V/USY gasoline sulfur reduction additive catalyst

We claim:

1. A method of reducing the sulfur content of a liquid catalytically cracked petroleum fraction, which comprises catalytically cracking a petroleum feed fraction containing organosulfur compounds at elevated temperature in the presence of an equilibrium cracking catalyst and a product sulfur reduction catalyst which comprises a porous molecular sieve having (i) a first metal component which is within the interior pore structure of the molecular sieve and which comprises vanadium in an oxidation state greater than zero and (ii) a second metal component comprising cerium which is within the interior pore structure of the molecular sieve, to produce liquid cracking products of reduced sulfur content.

2. A method according to claim 1 in which the product sulfur reduction catalyst comprises a large pore size or intermediate pore size zeolite as the molecular sieve component.

3. A method according to claim 2 in which the large pore size zeolite comprises a faujasite zeolite.

4. A method according to claim 2 in which the large pore size zeolite comprises zeolite USY.

5. A method according to claim 1 in which the second metal component is present in an amount from 0.5 to 10 weight percent of the catalytic composition.

6. A method according to claim 1 in which the product sulfur reduction catalyst comprises a USY zeolite having a UCS of from 2.420 to 2.455 nm; and a bulk silica:alumina ratio of at least 5.0 as the molecular sieve component.

7. A method according to claim 1 in which the sulfur reduction catalyst is a separate particle additive catalyst.

8. In a fluid catalytic cracking process in which a heavy hydrocarbon feed comprising organosulfur compounds is catalytically cracked to lighter products by contact in a cyclic catalyst recirculation cracking process with a circulating fluidizable catalytic cracking catalyst inventory consisting of particles having a size ranging from about 20 to about 100 microns, comprising:

(i) catalytically cracking the feed in a catalytic cracking zone operating at catalytic cracking conditions by contacting feed with a source of an equilibrium cracking catalyst to produce a cracking zone effluent comprising cracked products and spent catalyst containing coke and strippable hydrocarbons;

(ii) discharging and separating the effluent mixture into a cracked product rich vapor phase and a solids rich phase comprising spent catalyst;

(iii) removing the vapor phase as a product and fractionating the vapor to form liquid cracking products including gasoline;

(iv) stripping the solids rich spent catalyst phase to remove occluded hydrocarbons from the catalyst;

(v) transporting stripped catalyst from the stripper to a catalyst regenerator;

(vi) regenerating stripped catalyst by contact with oxygen containing gas to produce regenerated catalyst; and (vii) recycling the regenerated catalyst to the cracking zone to contact further quantities of heavy hydrocarbon feed, the improvement which comprises reducing the sulfur content of the gasoline portion of the liquid cracking products, by catalytically cracking the feed fraction at elevated temperature in the presence of a product sulfur reduction catalyst which comprises a porous molecular sieve having (i) vanadium which is within the interior, pore structure of the molecular sieve and which is in an oxidation state greater than zero and (ii) a second metal component which is within the interior pore structure of the molecular sieve and which comprises cerium.

9. A method according to claim 8 in which the cracking catalyst comprises a matrixed faujasite zeolite.

10. A method according to claim 8 in which the product sulfur reduction catalyst comprises a large pore size or intermediate pore size zeolite as the molecular sieve component and cerium as the second metal component.

11. A method according to claim 10 in which the large pore size zeolite of the product sulfur reduction catalyst comprises zeolite USY.

* * * * *